(12) United States Patent
Kuroda et al.

(10) Patent No.: US 7,987,395 B2
(45) Date of Patent: Jul. 26, 2011

(54) EVALUATION METHOD OF RANDOM ERROR DISTRIBUTION AND EVALUATION APPARATUS THEREOF

(75) Inventors: Masahiro Kuroda, Atsugi (JP); Takashi Furuya, Atsugi (JP); Kazuhiko Ishibe, Atsugi (JP)

(73) Assignee: Anritsu Corporation, Atsugi-Shi (JP)

( * ) Notice: Subject to any disclaimer, the term of this patent is extended or adjusted under 35 U.S.C. 154(b) by 85 days.

(21) Appl. No.: 12/501,647

(22) Filed: Jul. 13, 2009

(65) Prior Publication Data

US 2009/0282299 A1     Nov. 12, 2009

Related U.S. Application Data

(63) Continuation of application No. PCT/JP2008/050378, filed on Jan. 15, 2008.

(30) Foreign Application Priority Data

Jan. 15, 2007 (JP) .................................. 2007-006053

(51) Int. Cl.
    *G06F 11/00* (2006.01)
(52) U.S. Cl. ...................................................... 714/704
(58) Field of Classification Search .................. 714/704, 714/799; 324/385; 702/108, 127
See application file for complete search history.

(56) References Cited

U.S. PATENT DOCUMENTS

| 7,003,708 B1 * | 2/2006 | Ireland et al. ................. 714/739 |
| 2002/0120897 A1 | 8/2002 | Eby |
| 2005/0283505 A1 | 12/2005 | Fujimoto |

FOREIGN PATENT DOCUMENTS

| JP | 63-290423 A | 11/1988 |
| JP | 2002-330192 A | 11/2002 |
| JP | 2006-011492 A | 1/2006 |

OTHER PUBLICATIONS

Full English language translation of JP 2002-330192A, originally cited in the IDS form filed Jul. 13, 2009.
Section 12—Chi-square goodness of fit test of J. Gutman/S.C. Wils, joint translation by Ishii/Hori, Baifukan Co., Ltd, 1968, "Outline of Statistics" for engineers (and English language translation thereof), originally cited in the IDS form filed Jul. 13, 2009.
English language translation of paragraphs [0002]-[0012] and [0174] of JP 2006-011492A, originally cited in the IDS form filed Jul. 13, 2009.

(Continued)

*Primary Examiner* — Phung M Chung
(74) *Attorney, Agent, or Firm* — Holtz, Holtz, Goodman & Chick, PC (57) ABSTRACT

A degree of conformity of error distribution of a digital signal to the Poisson distribution is quantitatively determined. The digital signal including error data, which is randomly generated at a predetermined error rate, is divided into data number of measurement units, wherein the data number is determined on the basis of the error rate. A sample number of the measurement units are acquired from the measurement units, and the number of errors contained in each measurement unit is measured as a measurement value. Further, the number of times of occurrence of each measurement value is calculated, a Poisson distribution function is calculated, and a degree of a bond between the Poisson distribution and the distribution of the number of times of occurrence is determined by using the chi-square goodness-of-fit test method.

2 Claims, 11 Drawing Sheets

OTHER PUBLICATIONS

English language translation of relevant portions of JP 63-290423A, originally cited in the IDS form filed Jul. 13, 2009.

Masahiro Kuroda, Takashi Furuya "Poisson Error Hasseiki no Seino Hosho Gijutsu—FEC Noryoku ni yoru Seino Hyoka—", White Paper, Mar. 2007 (Japanese language version and English language version).

PCT Notification of Transmittal of copies of Translation of the International Preliminary Report on Patentability (Chapter I or II of the PCT) and Written Opinion issued in Appln. No. PCT/JP2008/050378 mailed Jul. 30, 2009, 7 pages.

* cited by examiner

Measurement value table 7

| Measurement value table $k$ | Number of times of occurrence $f$ | Function value $\theta$ | Expected value $n\theta$ | Deviation amount $(f-n\theta)^2$ | Normalized deviation amount $\dfrac{(f-n\theta)^2}{n\theta}$ |
|---|---|---|---|---|---|
| $k_1$ | $f_1$ | $\theta_1$ | $n\theta_1$ | $(f_1-n\theta_1)^2$ | $(f_1-n\theta_1)^2/n\theta_1$ |
| $k_2$ | $f_2$ | $\theta_2$ | --- | --- | --- |
| --- | --- | --- | --- | --- | --- |
| $k_i$ | $f_i$ | $\theta_i$ | $n\theta_i$ | $(f_i-n\theta_i)^2$ | $(f_i-n\theta_i)^2/n\theta_i$ |
| --- | --- | --- | --- | --- | --- |
| $k_m$ | $f_m$ | $\theta_m$ | $n\theta_m$ | $(f_m-n\theta_m)^2$ | $(f_m-n\theta_m)^2/n\theta_m$ |
| Total | $n$ | 1.00 | $n$ | — | $\chi^2$ |

$n$ : Sample (measurement unit) number $\chi^2$ : Chi-square value $\quad \chi^2 : \sum_{i=1}^{m} \dfrac{(f_i-n\theta_i)^2}{n\theta_i}$

| Measurement value k | Number of times of occurrence f | Expected value nθ |
|---|---|---|
| 0 | 1 | 1.5 |
| 1 | 5 | 6.3 |
| 2 | 16 | 13.2 |
| 3 | 17 | 18.5 |
| --- | --- | --- |
| 7 | 9 | 6.9 |
| 8 | 2 | 3.6 |
| 9 | 1 | 1.7 |
| 10 | 2 | 0.7 |
| 11 | 1 | 0.4 |
| Total | 100 | 100 | m = 12

Addition ⇒ 7.8

6.4

(b)

| Measurement value k | Number of times of occurrence f | Expected value nθ |
|---|---|---|
| 1 or less | 6 or less | 7.8 |
| 2 | 16 | 13.2 |
| 3 | 17 | 18.5 |
| --- | --- | --- |
| 7 | 9 | 6.9 |
| 8 or less | 6 or less | 6.4 |
| Total | 100 | 100 | m' = 8

← Combination (top)
← Combination (bottom)

| Digital signal $a_1$ | | | |
|---|---|---|---|
| k | f | $n\theta$ | $\dfrac{(f-n\theta)^2}{n\theta}$ |
| 6  | 7   | 6.241   | 0.092 |
| 7  | 15  | 8.782   | 4.402 |
| 8  | 20  | 16.854  | 0.587 |
| 9  | 31  | 28.750  | 0.176 |
| 10 | 35  | 44.138  | 1.892 |
| 11 | 59  | 61.603  | 0.110 |
| 12 | 80  | 78.814  | 0.018 |
| 13 | 92  | 93.076  | 0.012 |
| 14 | 102 | 102.068 | 0.000 |
| 15 | 104 | 104.467 | 0.002 |
| 16 | 105 | 100.240 | 0.226 |
| 17 | 76  | 90.526  | 2.331 |
| 18 | 81  | 77.211  | 0.186 |
| 19 | 62  | 62.389  | 0.002 |
| 20 | 45  | 47.891  | 0.175 |
| 21 | 38  | 35.012  | 0.255 |
| 22 | 29  | 24.433  | 0.854 |
| 23 | 17  | 16.309  | 0.029 |
| 24 | 11  | 10.433  | 0.031 |
| 25 | 15  | 14.762  | 0.004 |
| Total | 1024 | 1024.000 | $\chi^2 = 11.385$ |

Error rate $E = 10^{-3}$

Average value $\lambda = 15.352$

Sample number $n = 1024$

Measurement value number $m = 20$

Degree of freedom $\phi = 18$

Significance level $\alpha = 5\%$ $\chi^2$ value of $\alpha = 5\% = 28.8693$

Measurement $\chi^2$ value $= 11.385$

Determination : Conformity

FIG. 12

| Digital signal $a_2$ | | | |
|---|---|---|---|
| k | f | $n\theta$ | $\dfrac{(f-n\theta)^2}{n\theta}$ |
| 2 | 11 | 0.033 | 3686.598 |
| 3 | 12 | 0.145 | 966.550 |
| 4 | 16 | 0.554 | 430.730 |
| 5 | 23 | 1.688 | 296.053 |
| 6 | 30 | 4.287 | 154.204 |
| 7 | 30 | 9.333 | 45.761 |
| 8 | 49 | 17.778 | 54.830 |
| 9 | 60 | 30.102 | 29.696 |
| 10 | 58 | 45.871 | 3.207 |
| 11 | 53 | 63.546 | 1.750 |
| 12 | 57 | 80.695 | 6.958 |
| 13 | 62 | 94.590 | 11.229 |
| 14 | 55 | 102.958 | 22.339 |
| 15 | 58 | 104.595 | 20.757 |
| 16 | 47 | 99.617 | 27.792 |
| 17 | 51 | 89.295 | 16.423 |
| 18 | 38 | 75.596 | 18.698 |
| 19 | 49 | 60.630 | 2.231 |
| 20 | 43 | 46.196 | 0.221 |
| 21 | 33 | 33.522 | 0.008 |
| 22 | 32 | 23.219 | 3.321 |
| 23 | 27 | 15.384 | 8.772 |
| 24 | 20 | 9.768 | 10.719 |
| 25 | 24 | 5.954 | 54.699 |
| 26 | 18 | 3.489 | 60.340 |
| 27 | 11 | 1.969 | 41.408 |
| 28 | 8 | 1.072 | 44.783 |
| 29 | 6 | 0.563 | 52.483 |
| 30 | 8 | 0.286 | 207.998 |
| 31 | 9 | 0.141 | 558.127 |
| 32 | 25 | 0.122 | 5069.804 |
| Total | 1023 | 1023.000 | $\chi^2$=11881.488 |

Error rate $E = 10^{-3}$
Average value $\lambda = 15.2395$
Sample number $n = 1023$
Measurement value number $m = 31$
Degree of freedom $\phi = 29$ Significance level $\alpha = 5\%$
$\chi^2$ value of $\alpha = 5\%$ = 42.587
Measurement $\chi^2$ value = 1188.5
Determination : Non-conformity

EVALUATION METHOD OF RANDOM ERROR DISTRIBUTION AND EVALUATION APPARATUS THEREOF

CROSS-REFERENCE TO RELATED APPLICATIONS

This is a Continuation Application of PCT Application No. PCT/JP2008/050378, filed Jan. 15, 2008, which was published under PCT Article 21(2) in Japanese.

This application is based upon and claims the benefit of priority from prior Japanese Patent Application No. 2007-006053, filed Jan. 15, 2007, the entire contents of which are incorporated herein by reference.

BACKGROUND OF THE INVENTION

1. Field of the Invention

The present invention relates to a random error distribution evaluation method for evaluating error distribution of a digital signal which includes error data which is randomly generated at a predetermined error rate, and an evaluation apparatus thereof and, more particularly, to a random error distribution evaluation method arid random error distribution evaluation apparatus for quantitatively evaluating a degree of approximation (conformity) of error distribution of a digital signal which is measured as a measurement object, to the Poisson distribution.

2. Description of the Related Art

In a testing apparatus for carrying out various tests on various communication equipments which are incorporated in a digital communication network using a general electric signal cable or an optical communication network using an optical fiber cable, a test signal appropriate for the actual status of use of a communication equipment is input to the communication equipment which is a measurement object to be tested, and a response operation of the communication equipment is evaluated In one of evaluation tests for such communication equipment, there is employed a test signal which is intentionally subjected to contain error or errors, as a test signal which is appropriate for the actual status of use of the communication equipment and is supplied to the communication equipment to be measured. Further, it is evaluated to what degree of the rate of occurrence of the error (error rate) E, the communication equipment operates normally, the error being contained in the test signal.

An occurrence rate (error rate) E of an error (error bit) usually contained is of the order of $E=10^{-2}$ to $10^{-8}$, which is produced due to any factor including external noise and the like, in various digital signals to be transmitted/received in a communication network not for connecting general user terminals and a base station or subscriber terminals and a telephone office but for connecting stations to each other. Furthermore, the error occurs randomly.

Accordingly, in the testing apparatus, a random error signal generation circuit for generating a random error signal for causing an error of, for example, a bit of "1" at a designated error occurrence rate E, and furthermore at random is incorporated in addition to a test signal generation circuit for generating an original digital. test signal. Further, an EXCLUSIVE-OR operation of the digital test signal output from the test signal generation circuit and a random error signal output from the random error signal generation circuit is carried out, and the operation result is inverted, whereby a test signal containing an error of the designated error occurrence rate E is created.

It is proved that the occurrence frequency of events that incidentally occur in the natural world substantially follows the Poisson distribution. Accordingly, the distribution of errors contained in the various digital signals to be transmitted from/to a station of the above-mentioned communication network to/from another station thereof on the temporal axis also follows the Poisson distribution. For this reason, it is desirable that the error distribution of the random error signal generated by the random error signal generation circuit incorporated in the testing apparatus should also follow the Poisson distribution.

An example of the error signal generation circuit for generating a Poisson distribution error signal having error distribution of the Poisson distribution is proposed in Pat. Document 1 described below. Further, in Non-Pat. Document 1 also described below, there is disclosed fundamental logic theory for the chi-square goodness-of-fit determination method of quantitatively determining whether or not the statistically obtained occurrence distribution of an event conforms to the theoretical distribution Pat. Document 1: Jpn. Pat. Appln. KOKAI Publication No. 2002-330192

Non-Pat. Document 1: J. Gutman/S.C. Wils, joint translation by Ishii/Hori, BAIFUKAN CO., LTD, 1968, "Outline of Statistics" for engineers

BRIEF SUMMARY OF THE INVENTION

However, at the present time, there is a fact that the technique for generating a random error signal having error distribution accurately following the Poisson distribution is incomplete. There is also incomplete in the technique for quantitatively evaluating to what degree the error distribution of a random error signal generated from the random error signal generation circuit conforms to the Poisson distribution. It should be noted that an accurate error occurrence rate E of an error contained in a random error signal can be realized in a relatively easy way by using a counter and comparator.

The present invention has been contrived in consideration of these circumstances, and an object of the present invention is to provide a random error distribution evaluation method and a random error distribution evaluation apparatus capable of quantitatively grasping to what degree the error distribution of a digital signal output from a signal, generation circuit and having a predetermined error rate conforms to the Poisson distribution, and improving the test accuracy of a testing apparatus for a measurement object to be tested, in which the signal generation circuit is incorporated.

In order to achieve the object described above, according to an aspect of the present invention, there is provided a method of evaluating a random error distribution, comprising:

a step of dividing a digital signal into n number of measurement units, wherein the digital signal includes error data which is randomly generated at a predetermined error rate in the digital signal, and the n number of the measurement units is determined on the basis of the error rate, acquiring the measurement units corresponding to a sample number set in advance, and storing the acquired measurement units in a storage section;

a measuring step of measuring the number of errors contained in each of the measurement units corresponding to the sample number as a measurement value;

a average calculating step of calculating an average measurement value of the measurement values of the measurement units measured in the error measurement step;

an occurrence calculation step of calculating the number of times of occurrence of each measurement value from the measurement value of each measurement unit measured in the error measurement step;

a Poisson distribution calculating step of calculating a Poisson distribution function in which the measurement value is used as a variable by using the calculated average measurement value;

an expected value calculating step of calculating an expected value of the number of times of occurrence of the measurement value from a function value of each measurement value of the calculated Poisson distribution function;

a chi-square value calculating step of calculating a chi-square value obtained by integrating a deviation of the number of times of occurrence from the expected value in each measurement value over the whole measurement values;

a target chi-square value calculating step of calculating a target chi-square value corresponding to a designated significance level in a chi-square distribution function determined by a degree or degrees of freedom obtained from the number of the measurement values; and a determining step of determining that the error distribution of the digital signal conforms to the Poisson distribution when the calculated chi-square value is smaller than the target chi-square value.

In the random error distribution evaluation method configured as described above, in order to compare the error distribution of a digital signal which is measured as the object and the Poisson distribution (probability density function) indicating the statistic probability (number of times) of occurrence for each measurement value with each other, the digital signal including a predetermined error rate is divided into the measurement units each of which is constituted of data items of a number determined on the basis of the error rate, the measurement units corresponding to a sample number set in advance are acquired, the acquired measurement units are temporarily stored in the storage section, thereafter the number of errors contained in each of the measurement units is measured as a measurement value, and the number of times of occurrence of each measurement value is obtained.

Further, a chi-square value indicating an area deviation of the measured distribution from the Poisson distribution is calculated, and when this chi-square value is smaller than a target chi-square value corresponding to the designated significance level, it is determined that the error distribution of the digital signal which is the object to be measured conforms to the Poisson distribution.

Further, according to another aspect of the present invention, there is provide art apparatus for evaluating conformity of error distribution of a digital signal to the Poisson distribution, wherein the digital signal includes error data which is randomly generated at a predetermined error rate in the digital signal, the apparatus comprising:

a measurement parameter memory (5) configured to store input measurement parameters including data number Na, sample number n, and a significance level α (%) of the conformity evaluation, wherein the data number Na is determined depending on the error rate;

a data input section (2, 11) configured to input a digital signal, which is measured as an measurement object, and divide the digital signal into the data number Na of measurements units, and output sample number n of the measurements units which is sampled from the data number Na of measurements units;

an error measurement section (12) configured to measure the number of errors contained in each of the sample number n of the measurement units from the data input section to output measurement values of the measurement units;

an average calculation section (13) configured to calculate an average value of the measurement values output from the error measurement section;

an occurrence calculation section (15) configured to calculate the number of times of occurrence of the measurement values measured in the error measurement section;

a measurement value table (7) configured to store the number of times of occurrence calculated for each of the measurement values;

a Poisson distribution calculation section (14) configured to calculate a Poisson distribution function in which the measurement value is used as a variable by using the calculated average measurement value;

an expected value calculation section (16) configured to calculate an expected value of the number of times of occurrence of the measurement value from a function value of each measurement value of the calculated Poisson distribution function, and writing the calculated value to the measurement value table;

a chi-square value calculation section (18) configured to calculate a chi-square value which is obtained by integrating a deviation of the number of times of occurrence from the expected value in each measurement value over the whole measurement values;

a target chi-square value calculation section (21) configured to calculate a target chi-square value corresponding to a designated significance level in a chi-square distribution function determined by a degree or degrees of freedom obtained from the number of the measurement values;

a determination section (19) configured to determine that the error distribution of the random error signal conforms to the Poisson distribution when the calculated chi-square value is smaller than the target chi-square value; and a display section (3) configured to display a determination result of the determination section.

In the random error distribution evaluation apparatus configured as described above too, it is possible to exert substantially the same function and effect as those of the above-mentioned random error distribution evaluation method.

DETAILED DESCRIPTION OF THE INVENTION

An embodiment of the present invention will be described below with reference to the accompanying drawings.

Figure 1:
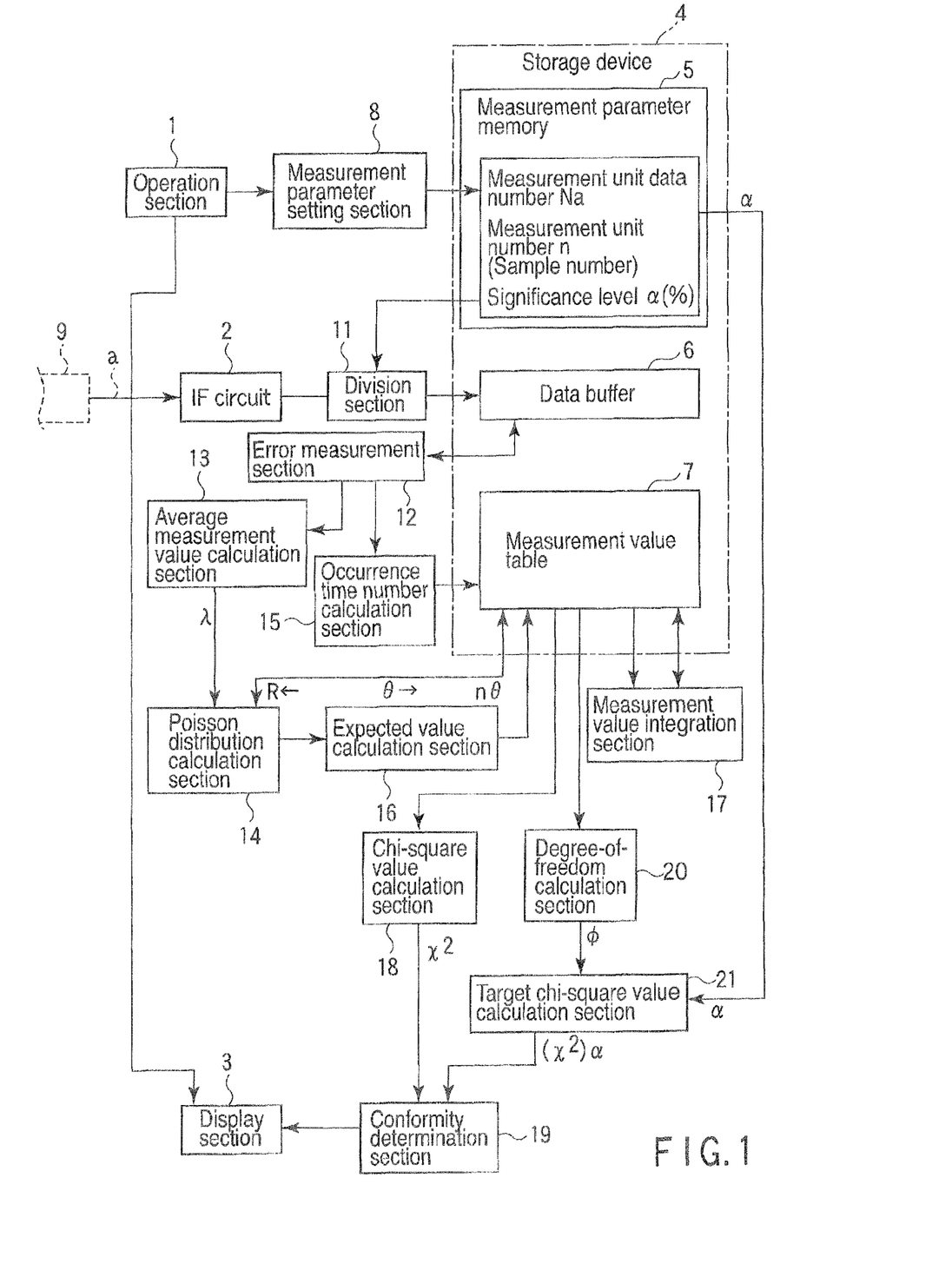
FIG. 1 is a schematic block diagram showing an apparatus for evaluating random error distribution to which a method of evaluating the random error distribution to an embodiment of the present invention is applied.

FIG. 1 is a block diagram showing the schematic configuration of an apparatus for evaluating random error distribution, to which a method of evaluating random error distribution according to an embodiment of the present invention is applied.

In the random error distribution evaluation apparatus which is constituted of an information processing apparatus such as a computer or the like, hardware constituent parts or members includes an operation section 1, for example, a mouse, keyboard, and the like, which are used by the measurement operator to input various measurement parameters and initial setting conditions of the significance level, and an interface (IF) circuit 2 to which a digital signal a is supplied, as an measurement object to be measured, from a signal generation circuit 9. The digital signal has a predetermined error rate E, wherein error data is randomly entered in the digital signal. The hardware constituent parts or members also includes a display section 3 for displaying outputs, for example, measurement parameters which is input from the operation section 1, and determination results, and a storage device 4, for example, a hard disk drive (HDD) for storing and retaining various types of data. It should be noted that in the random error distribution evaluation apparatus, there are many software constituent parts configured on the application programs in addition to the above-mentioned hardware constituent members.

In the storage device 4, there are provided a measurement parameter memory 5, data buffer 6, and measurement value table 7. The configuration and operation of each section will be described as follows.

Information relating to the digital signal a is input from the operation section 1 by the measurement operator, and is processed in the a measurement condition setting section 8 so that the data number Na for each of the measurement units, measurement unit number, i.e., sample number n (sample size called in the statistics), and significance level α (%) are stored in the measurement parameter memory 5, wherein the significance level α (%) is used as the determination criterion of the goodness of fit of the error distribution of the digital signal a in respect to the Poisson distribution.

Figure 2:
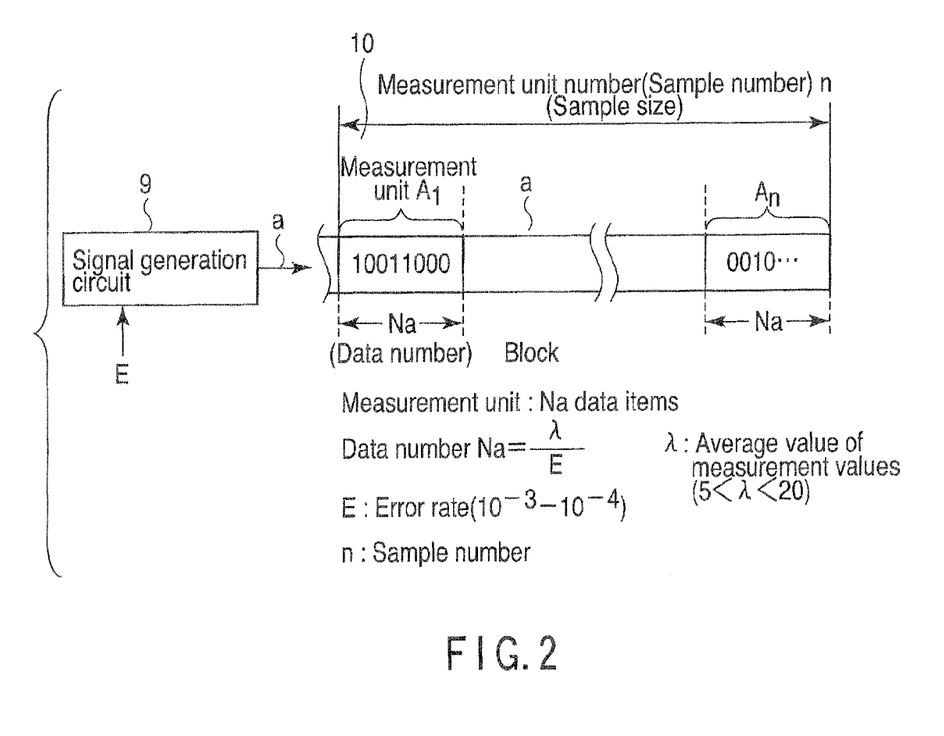
FIG. 2 is a schematic view showing a division method of a digital signal which is measured as an object in the random error distribution evaluation apparatus according to the embodiment.

Each measurement parameter will be described below by using FIG. 2. It is assumed that the digital signal a output from the random error signal generation circuit 9 includes an error which is produced at the error rate E. When the error rate E is, for example, $10^{-3}$, the "error" bit is contained in the digital signal one out of 1000 "normal" bits.

Figure 5:
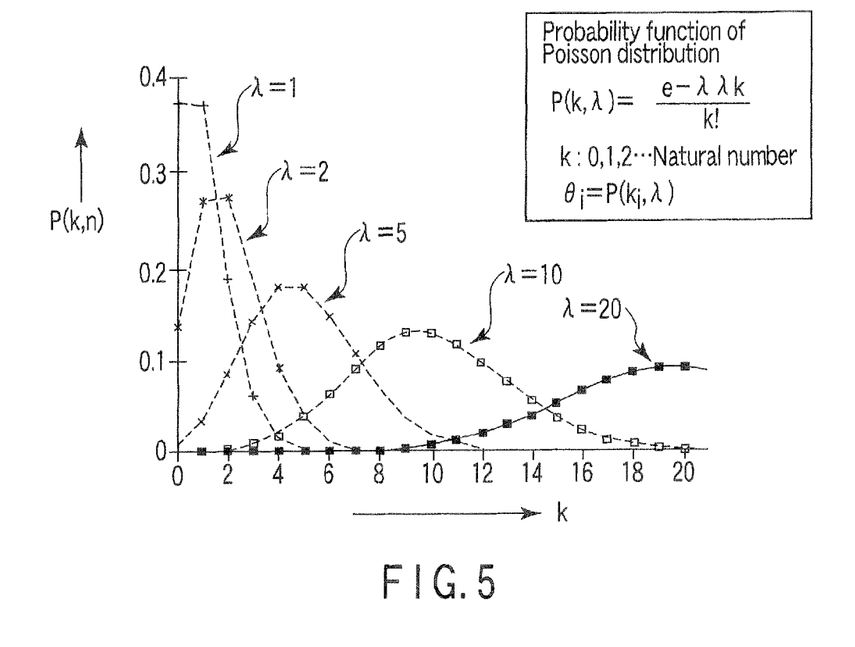
FIG. 5 is a schematic view showing the Poisson distribution function.

Next, the data number Na of the measurement unit will be described below. As shown in FIG. 5, the Poisson distribution function (probability density function):

$$P(k, \lambda) = (e^{-\lambda} \cdot \lambda^k)/k!$$

indicates the probability of the occurrence frequency for each measurement value (error number) k per unit period, per unit area, per unit number of persons, and per unit data number. Accordingly, the average value λ of the measurement value k in the measurement unit indicates the maximum probability. The Poisson distribution changes in accordance with the value of the average value λ, and hence the data number Na of the measurement unit 10 is set in such a manner that the average value λ becomes, for example, 5 or more, and 20 or less as shown in FIG. 2. For example in the case where the error rate E is 0.001 (E=0.001), and the average value λ is made present in the vicinity of 5, the data number Na of the measurement unit 10 becomes 5000.

Further, the number (sample number) n of the measurement unit 10 is set in, for example, data communication, at about 1000 (n=1000) from the viewpoint of the statistical reliability and measurement processing time.

Figure 3:
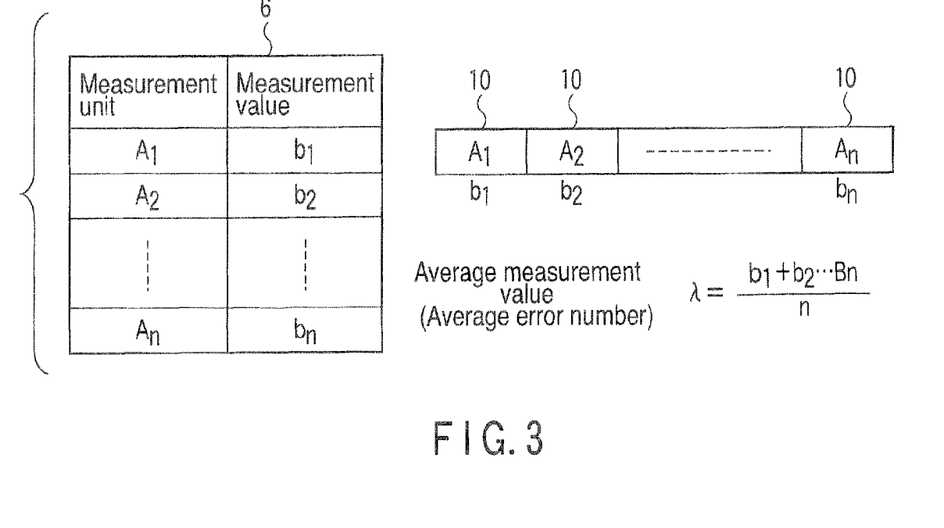
FIG. 3 is a schematic view showing the storage contents in a data buffer provided in a storage device of the random error distribution evaluation apparatus.

The digital signal a input from the random error signal generation circuit 9 is divided into the Na data number of measurement units 10 in a division section 11, wherein the Na data number is set in the measurement parameter memory 5, and measurement units $A_1, A_2, \ldots, A_n$ of the sample number n are selected from the Na data number of measurement units 10 and written in a data buffer 6, as shown in FIG. 3. Further, the number of errors contained in each of the n pieces of measurement units $A_1, A_2, \ldots, A_n$ which are divided and stored in the data buffer 6 is measured by an error measurement section 12, and the measured numbers are written to the data buffer 6 as measurement values $b_1, b_2, \ldots, b_n$.

Furthermore, an average measurement value calculation section 13 calculates the average measurement value (average error number) λ of the n pieces of measurement units 10, and transmits the calculated values to a Poisson distribution calculation section 14.

$$\lambda = (b_1 + b_2 + \ldots + b_n)/n$$

Figure 4:
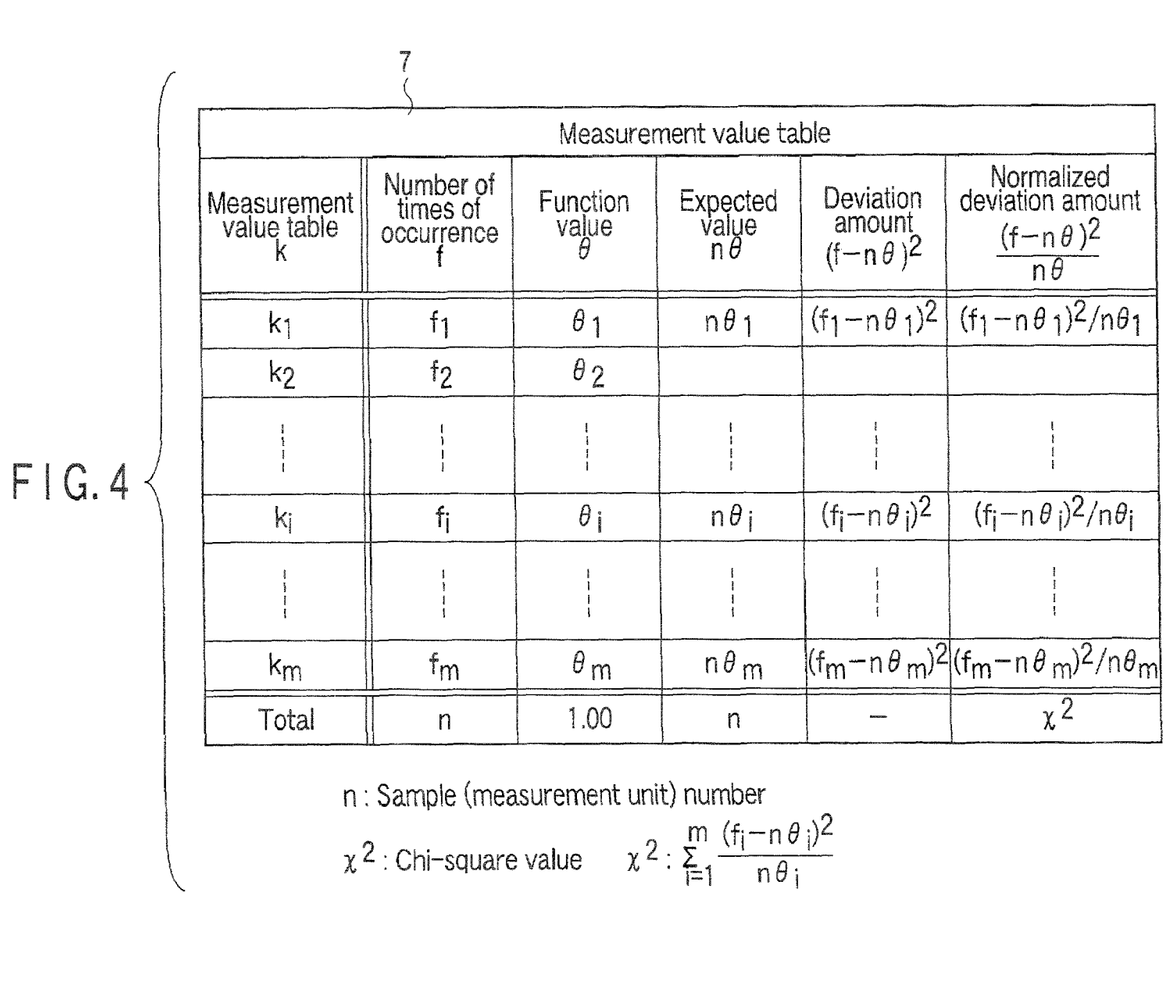
FIG. 4 is a schematic view showing the storage contents of a measurement value table in the storage device of the random error distribution evaluation apparatus.

An occurrence time number calculation section 15 calculates the numbers of times of occurrence $f_1, f_2, f_3, \ldots, f_i, \ldots, f_m$ of the measurement values $k_1, k_2, k_3, \ldots, k_i, \ldots, k_m$ in the case where the measurement values $b_1, b_2, b_n$ of the n pieces of measurement units $A_1, A_2, \ldots, A_n$ measured by the error measurement section 12 are arranged in order of the size of the measurement value, and writes the calculated numbers to the measurement value table 7 shown in FIG. 4. Accordingly, the total of the numbers of times of occurrence $f_1, f_2, f_3, \ldots, f_i, \ldots, f_m$ becomes the sample number n.

A function value θ of the Poisson distribution function, expected value nθ deviation amount $(f-n\theta)^2$, and normalized deviation amount $(f-n\theta)^2/n\theta$ are written to the measurement value table 7 in addition to the number of times of occurrence f corresponding to each measurement value k.

A value obtained by integrating the normalized deviation amounts $(f-n\theta)^2/n\theta$ over the whole measurement values $k_1$, $k_2, k_3, \ldots, k_i, \ldots, k_m$ becomes a value generally called the "chi-square value". This chi-square value is expediently represented as "$\chi^2$" by using a Greek character.

The Poisson distribution calculation section 14 substitutes the actually measured average value (average measurement value) $\lambda$ into the Poisson distribution function (probability density function) P $(k, \lambda)=(e^{-\lambda} \cdot \lambda^k)/k!$ which is univocally determined by the average measurement value $\lambda$ calculated by the average measurement value calculation section 13, and is shown in FIG. 5, and substitutes the actual measurement values $k_1, k_2, k_3, \ldots, k_i, \ldots, k_m$ into the measurement value k to thereby calculate the function values $\theta_1, \theta_2, \theta_3, \ldots, \theta_i, \ldots, \theta_m$ of the measurement values $k_1, k_2, k_3, \ldots, k_i, \ldots, k_m$, and write the calculated function values to the measurement value table 7. The Poisson distribution function 4 is a probability density function, and hence the area of the mountain shape waveform is "1". Accordingly, the total of the function values $\theta_1, \theta_2, \theta_3, \ldots, \theta_i, \theta_m$ is "1.00". The Poisson distribution calculated in this manner becomes the Poisson distribution which, is the target of the error distribution of the digital signal a which is measured as the object.

Each of the calculated function values $\theta$ is a normalized function value, and hence an expected value calculation section 16 multiplies the function values $\theta$ by the actual sample number n to calculate the expected values (expected numbers of times) $n\theta_1, n\theta_2, n\theta_3, \ldots, n\theta_i, \ldots, n\theta_m$ for the respective measurement values $k_1, k_2, k_3, \ldots, k_i, \ldots, k_m$ and write the calculated expected values to the measurement value table 7. Therefore, the total of the expected values $n\theta$ is the sample number n.

Figure 7:
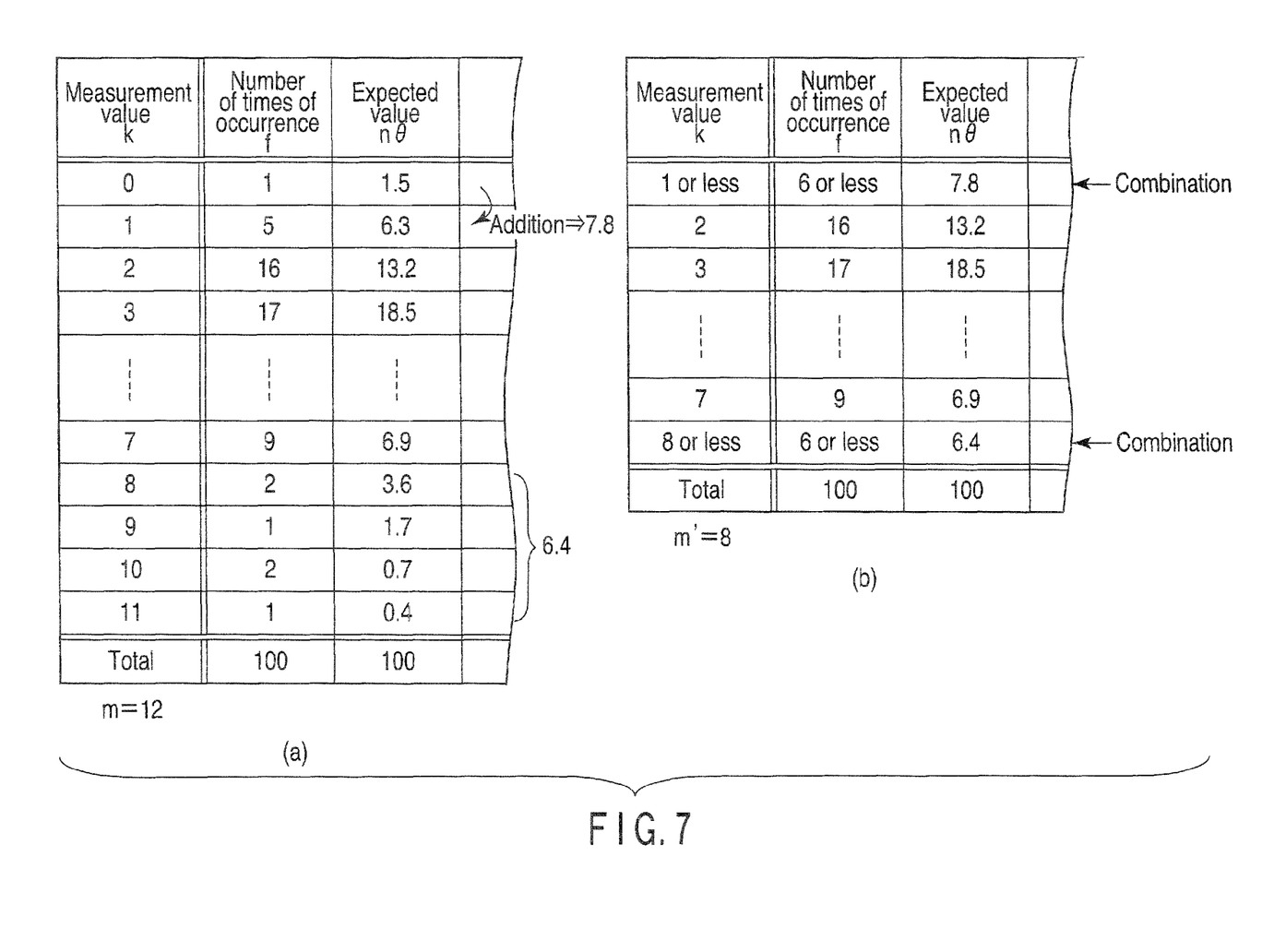
FIG. 7 shows schematic views for explaining the integration processing procedure of the measurement values in the measurement value table of the random error distribution evaluation apparatus.

At this point in time, a measurement value integration section 17 is started to operate. If a measurement value k of the expected value $n\theta$ of 5 or less is present at both end parts of the mountain shape waveform of the Poisson distribution, the measurement value k is integrated with the expected value $n\theta$ of the adjacent measurement value to form an expected value exceeding 5. If, for example, a measurement value of the expected value of "1.5" is present as shown in FIG. 7(*a*), the measurement value is integrated with the adjacent measurement value of the expected value of "6.3", and the resultant is written to a column of the measurement value of 1 or less with an expected value of "7.8". Further, the measurement values of the expected values "3.6", "1.7", "0.7", and "0.4" of the measurement values 8, 9, 10, and 11 positioned at the side end part at which the measurement value is large are put together into a column of the measurement value of 8 or more with the expected value of "6.4". Accordingly, in the example of FIG. 7, the number m of the measurement value k is reduced from 12 to 8 by 4. The measurement values k of the expected value $n\theta$ of 5 or less are put together in order to improve the calculation accuracy of the next chi-square function (probability density function) F $(\chi^2, \phi)$.

Figure 6:
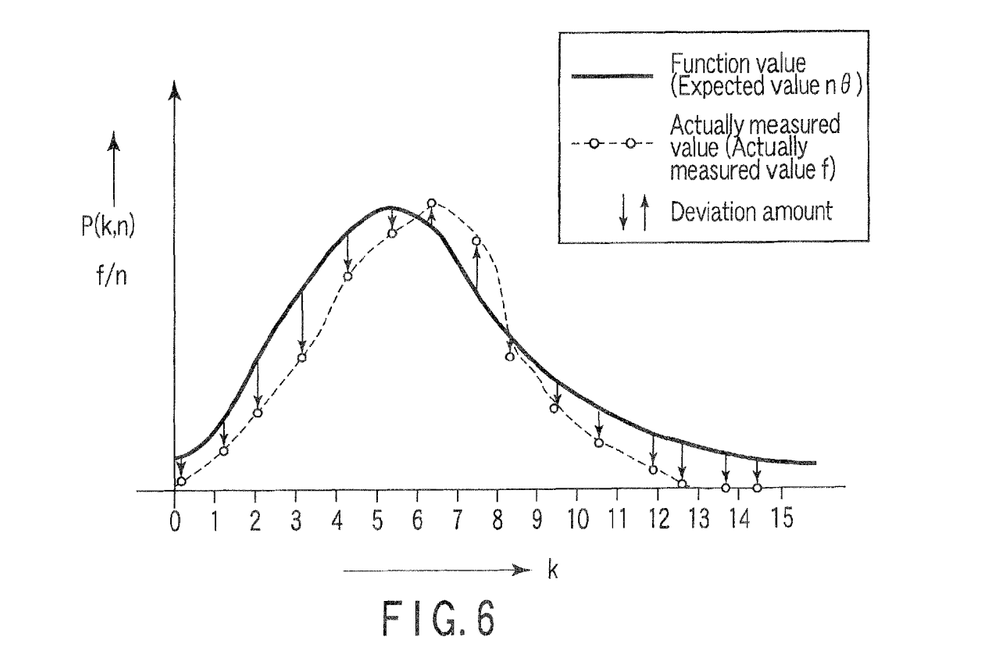
FIG. 6 is a schematic view showing a relationship between the measured error distribution and the Poisson distribution.

When the integration of the row of the measurement value table 7 of FIG. 4 for the measurement values k is completed by the measurement value integration section 17, a chi-square value calculation section 18 calculates, as indicated by the arrows "↓" and "↑" in the Poisson distribution function of FIG. 6, deviation amounts $(f-n\theta)^2$ each of which is indicated by a square value of a difference between the actually measured number of times of occurrence $f_1, f_2, f_i, \ldots, f_i, \ldots, f_m$ for each measurement value $k_1, k_2, k_3, \ldots, k_i, \ldots, k_m$, and the expected value $n\theta_1, n\theta_2, n\theta_3, \ldots, n\theta_i, \ldots, n\theta_m$, and the normalized deviation amounts $(f_1-n\theta_1)^{2/n}\theta_1, (f_2-n\theta_2)^{2/n}\theta_2, (f_3-n\theta_3)^{2/n}\theta_3, \ldots, (f_i-n\theta_i)^{2/n}\theta_i, \ldots, (f_m-n\theta_m)^{2/n}\theta_m$, and writes the calculated values to the measurement value table 7. The chi-square value calculation section 18 further integrates the normalized deviation amounts $(f_i-n\theta_i)^{2/n}\theta_i$ over the whole measurement values $k_1$ to $k_m$ to calculate the "chi-square value $\chi^2$".

$$\text{Chi-square value } \chi^2 = \sum_{i=1}^{m} \frac{(f_i - n\theta_i)^2}{n\theta_i} \quad \text{[MATH 1]}$$

The chi-square value calculation section 18 sends the calculated chi,-square value $\chi^2$ to a conformity determination section 19.

Figure 9:
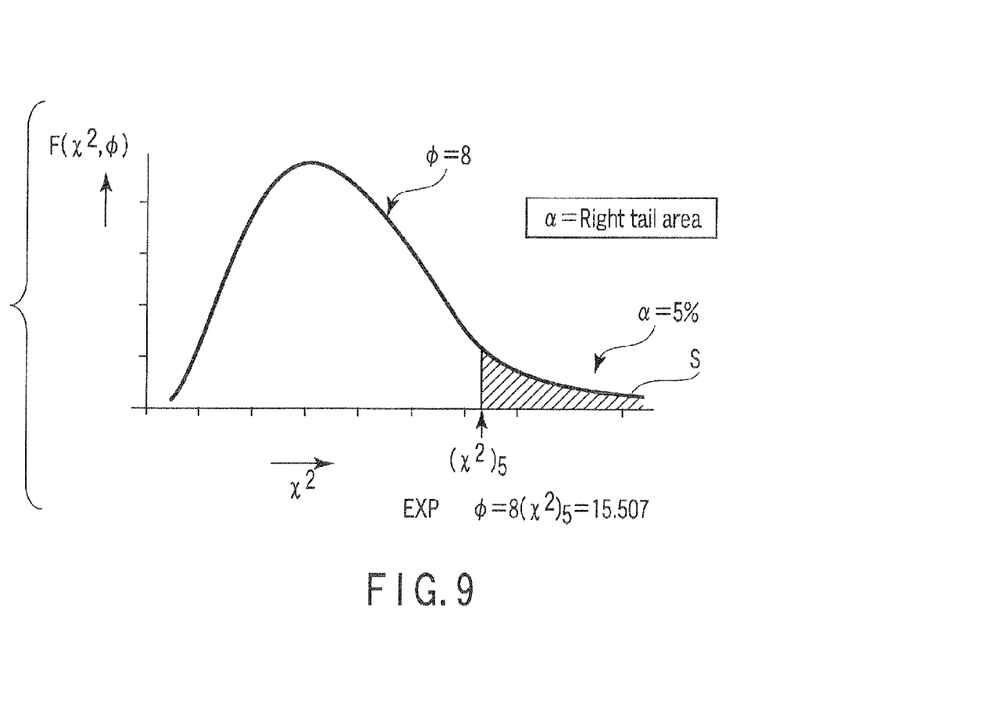
FIG. 9 is a schematic view showing a relationship between the significance level and the chi-square value in the chi-square value function.

Then, a degree-of-freedom calculation section 20 makes the degree or degrees of freedom $\phi$ for calculating the chi-square function (probability density function) F $(\chi^2, \phi)$ shown in FIG. 9 a value obtained by subtracting 2 from the number m of the measurement values k which is set in the measurement value table 7 shown in FIG. 4, and is already integrated/adjusted.

$$\phi = m - 2$$

Here, the degree or degrees of freedom $\phi$ is or are expressed by the following expression.

$\phi$=number of items of table (number of measurement values)$-1-t$

In the expression, t is the estimated number of parameters. In this case, $\lambda$ is estimated, and hence the above value is set.

The chi-square function F $(\chi^2, \phi)$ is expressed by $$F(\chi^2, \phi) = \frac{1}{2\Gamma\left(\frac{\phi}{2}\right)} \cdot \left(\frac{\chi^2}{2}\right)^{\frac{\phi}{2}-1} \cdot e^{-\frac{\chi^2}{2}} \quad \text{[MATH 2]}$$

described above.

It should be noted that $\Gamma(\phi/2)$ is a gamma function For example, when the degrees of freedom are 5 ($\phi=5$), $\Gamma(\phi/2) \ \Gamma(5/2)=(3\pi^{1/2}) \approx 1.392$ is obtained.

Figure 8:
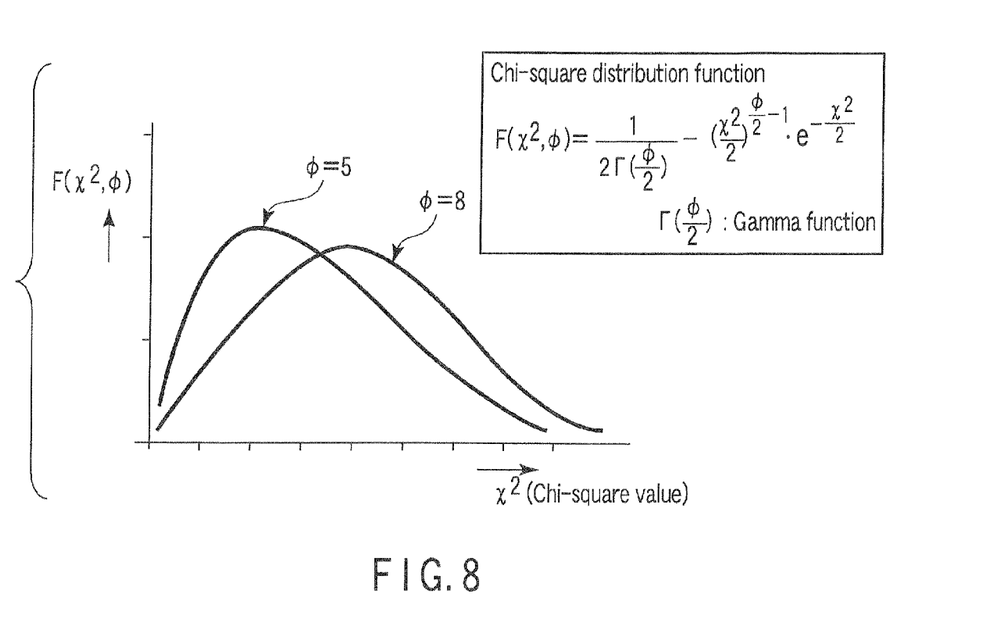
FIG. 8 is a schematic view showing the chi-square value function employed in the random error distribution evaluation apparatus.

As shown in FIG. 8, the chi-square function F $(\chi^2, \phi)$ is a distribution probability density function including the [chi-square value $\chi^2$] for quantitatively determining to what degree the measured distribution conforms to the targeted distribution as a variable, and is a function in which the function value F $(\chi^2, \phi)$ of each [chi-square value $\chi^2$] is univocally determined when the degree or degrees of freedom $\phi$ of the measurement value k is or are determined.

The smaller the [chi-square value $\chi^2$] corresponding to the sum total of the deviation amounts calculated by the chi-square value calculation section 18 with respect to the Poisson distribution is, the greater the goodness of fit is. That is, the goodness of fit can be evaluated by the ratio (%) of the right tail area S which is indicated by the shading of the chi-square distribution shown in FIG. 9, and is on the right side of the [chi-square value $\chi^2$] to the overall area $S_A(=1)$.

The operator of the measurement designates a significance level $\alpha$ (%) by which it is determined that the measured distribution conforms to the targeted distribution by means of the operation section 1, and sets in advance the significance level in the measurement parameter memory 5. This significance level $\alpha$ (%) is experientially 5% ($\alpha=5\%$), this making it possible to consider that the measured distribution sufficiently conforms to the targeted distribution.

Accordingly, a target chi-square value calculation section 21 calculates a target chi-square value $(\chi^2)\alpha$ which makes the ratio (%) of the right tail area S to the overall. area $S_A$ in the chi-square function $F(\chi^2, \phi)$ shown in FIG. 9 the significance level $\alpha$ (%), and sends the calculated value to the conformity determination section 19.

When the [chi-square value $\chi^2$] calculated by the chi-square value calculation section 18 is smaller than the [target chi-square value $(\chi^2)\alpha$] calculated by the target chi-square value calculation section 21, the conformity determination section 19 determines that the error distribution of the digital signal a which is measured as the measurement object conforms to the Poisson distribution, and display-outputs the determination result to the display section 3.

Figure 10:
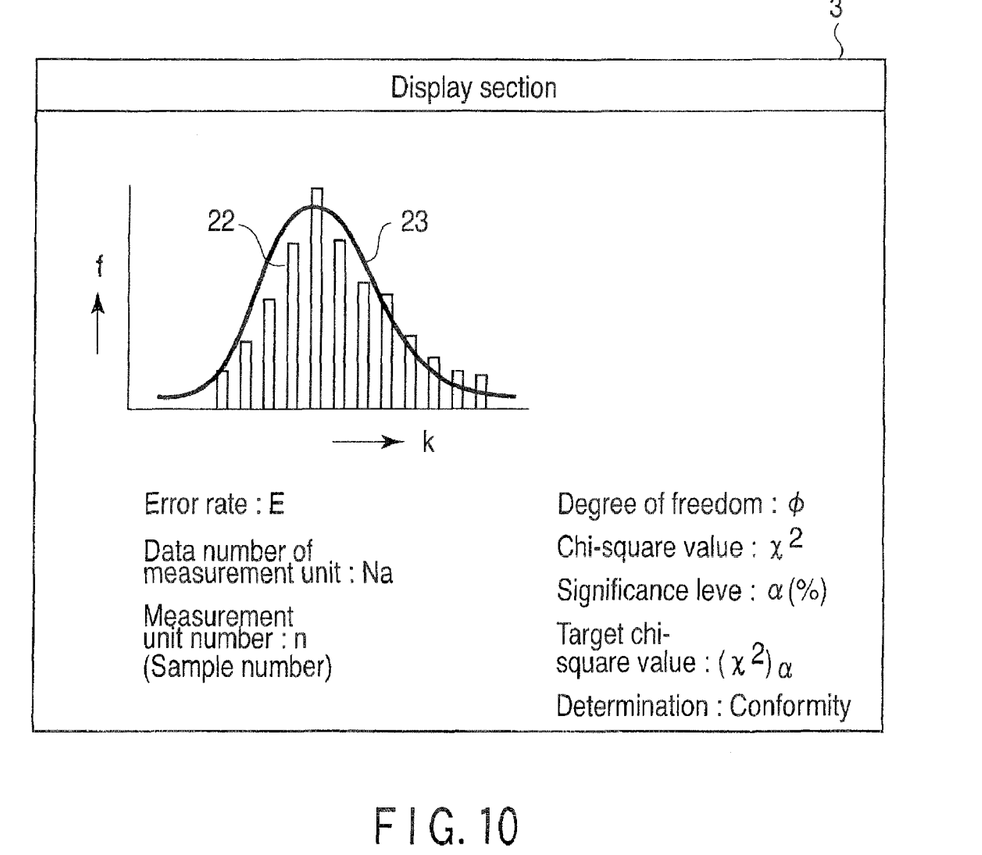
FIG. 10 is a schematic view showing the display contents of a display section of the random error distribution evaluation apparatus.

As shown in FIG. 10, the error distribution 22 of the digital signal a of the measurement object, Poisson distribution 23, error rate E, data number Na of the measurement unit, measurement unit number (sample number) n, degree or degrees of freedom $\phi$, chi-square value $\chi^2$, significance level $\alpha$ (%), target chi-square value $(\chi^2)\alpha$, determination result, and the like are displayed on the display section 3.

Figure 11:
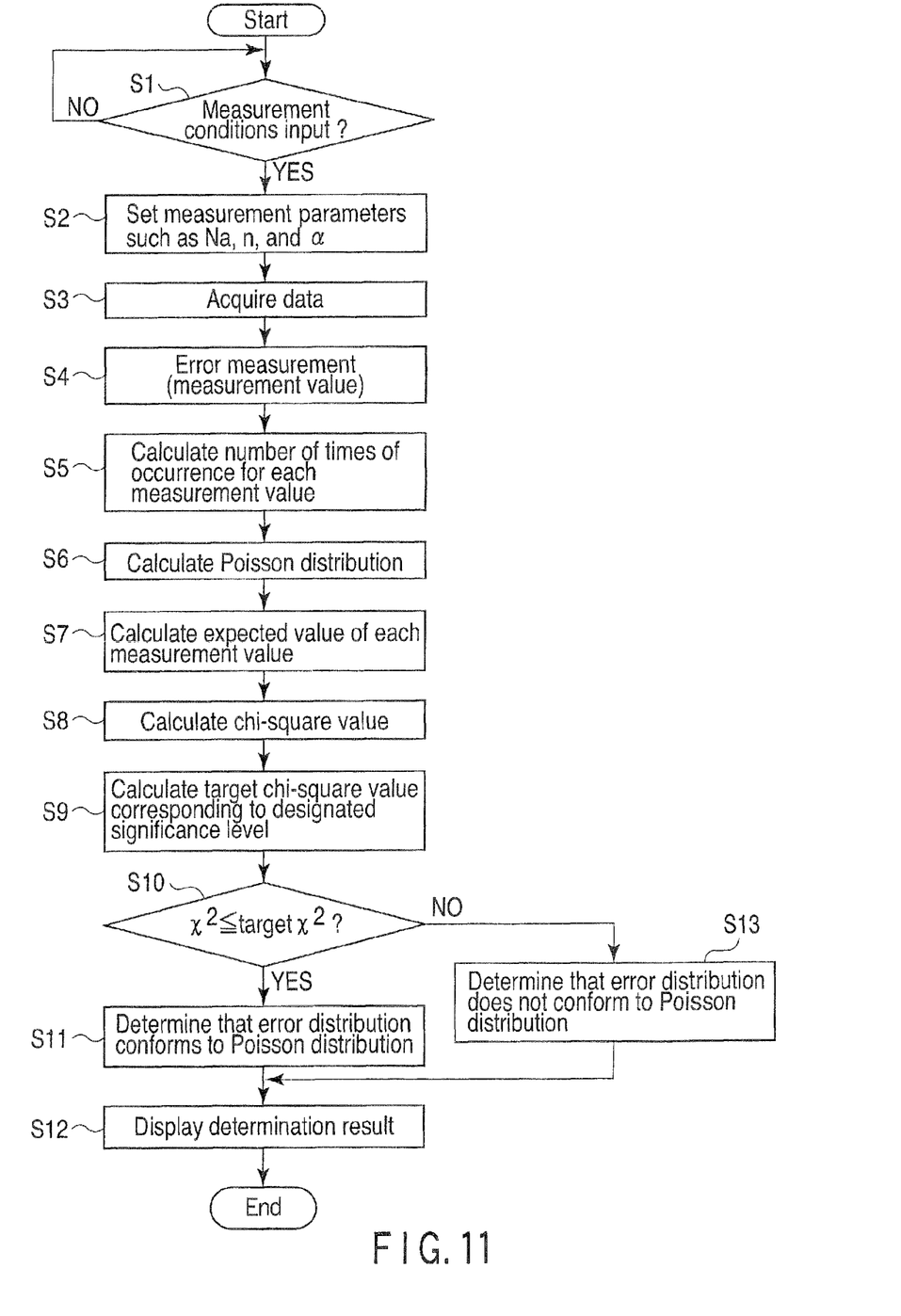
FIG. 11 is a flowchart showing the overall evaluation operations of the random error distribution evaluation apparatus.

FIG. 11 is a flowchart showing the overall evaluation operations of the random error distribution evaluation apparatus configured as described above. When the measurement parameters such as the measurement unit data number Na, sample number n, significance level $\alpha$, error rate E, and the like are input from the operation section 1 (step S1), these measurement parameters are set in the measurement parameter memory 5 (S2). Further, the digital signal a as the measurement object is acquired in accordance with the measurement parameters (S3). The measurement value of the error number of each measurement unit of the acquired digital signal a is obtained (S4). Further, the number of times of occurrence f for each measurement value k is calculated (S5)

The Poisson distribution determined by the average value $\lambda$ of the measurement values of the measurement units is calculated (S6), and the expected value $n\theta$ of each measurement value k, is calculated (S7). Then, the [chi-square value $\chi^2$] corresponding to the sum total of the deviation amounts obtained with respect to the Poisson distribution is calculated (S8). Furthermore, the [target chi-square value $(\chi^2)\alpha$] corresponding to the designated significance level $\alpha$ is calculated (S9).

Further, the sizes of both the above values are compared with each other (S10). When the [chi-square value $\chi^2$] of the digital signal a of the measurement object is smaller than the [target chi-square value $(\chi^2)\alpha$] (S10), it is determined that the error distribution of the digital signal a of the measurement object conforms to the Poisson distribution (S11), and the conformity determination result is display-output to the display section 3 (S12).

On the other hand, when the [chi-square value $\chi^2$] of the digital signal a which is the measurement object is larger than the [target chi-square value $(\chi^2)\alpha$] (S10), it is determined that the error distribution of the digital signal a which is the measurement object does not conform to the Poisson distribution (S13), and the nonconformity determination result is display-output to the display section 3 (S12).

Next, the result of determination about the conformity/non-conformity of two types of digital signals $a_1$ and $a_2$ different from each other in error distribution to the Poisson distribution using the random error distribution evaluation apparatus configured as described above will be described below.

Figure 12:
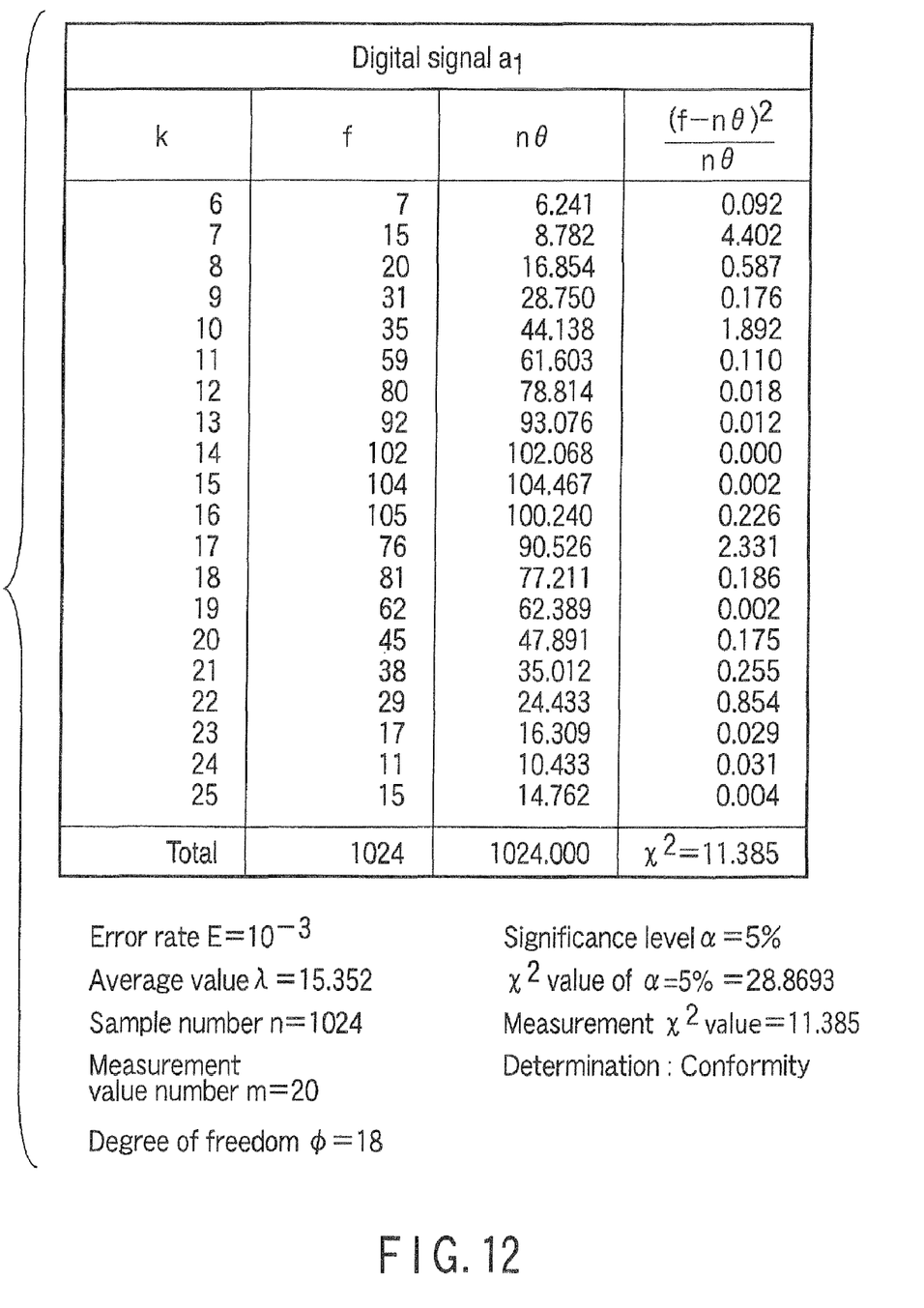
FIG. 12 is a schematic view showing the measured data of a digital signal $a_1$ in the random error distribution evaluation apparatus.
Figure 13:
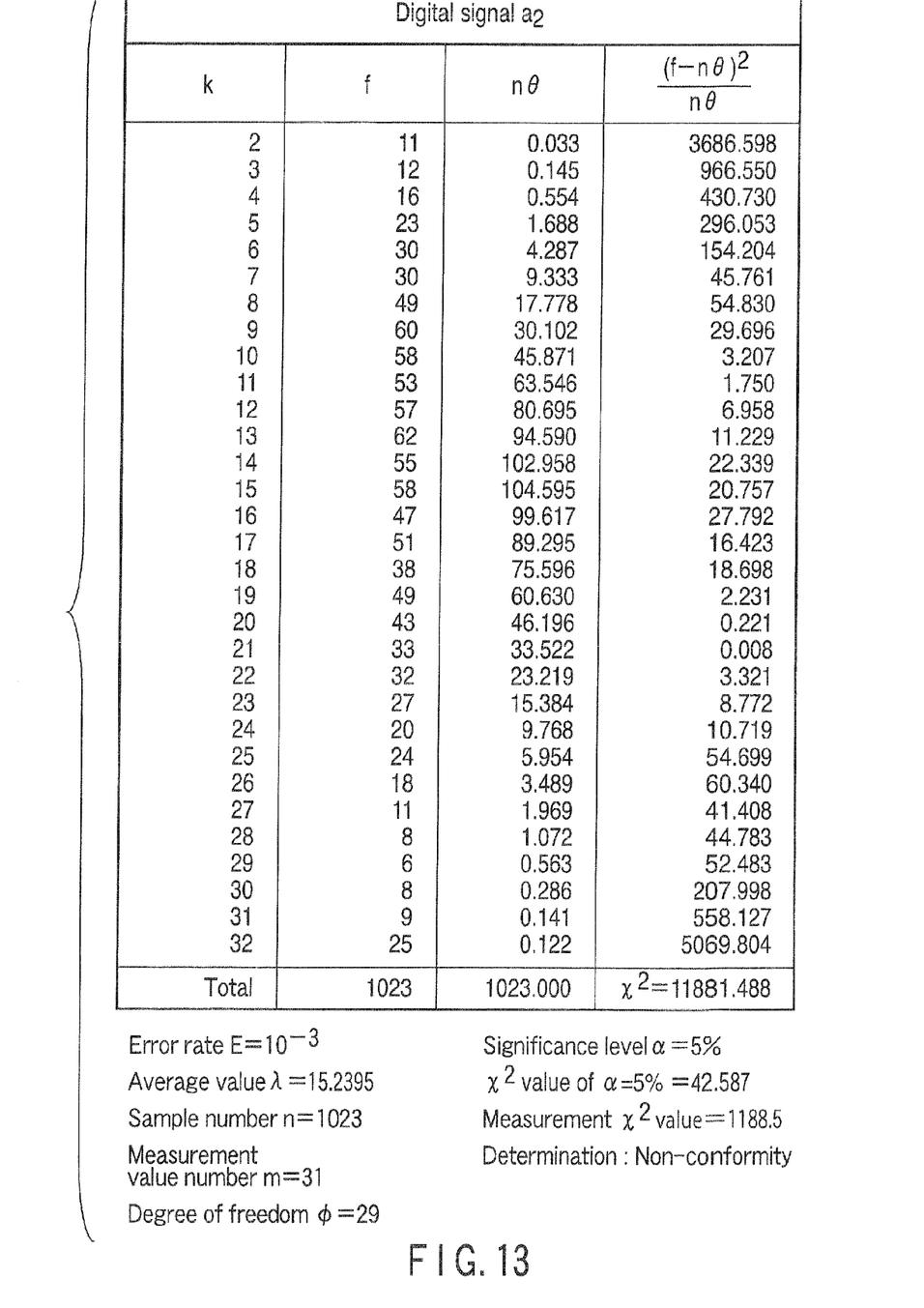
FIG. 13 is a view showing the measured data of another digital signal $a_2$ in the random error distribution evaluation apparatus.
Figure 14:
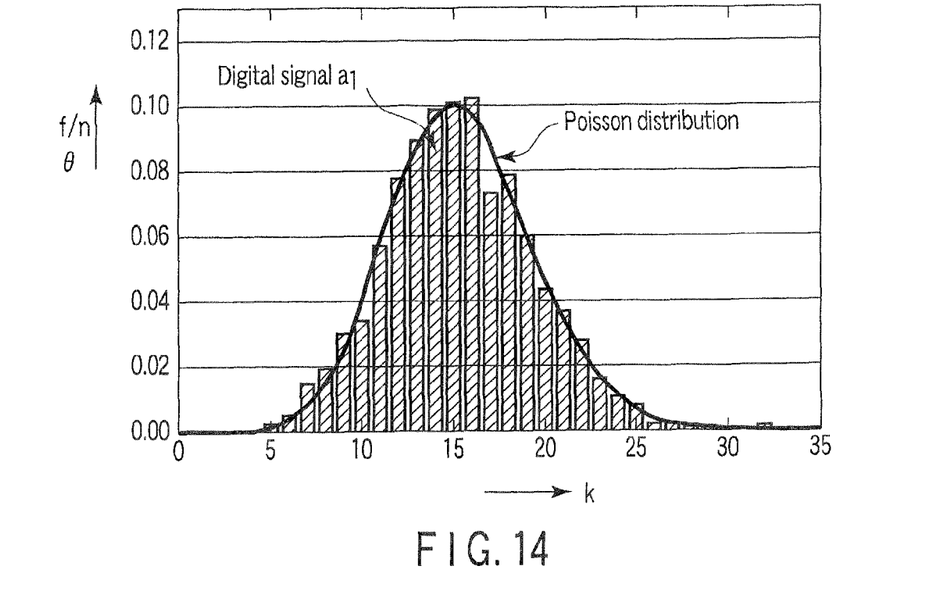
FIG. 14 is an error distribution chart of the digital signal $a_1$ measured by the random error distribution evaluation apparatus.

FIG. 12 is a view showing the determination results, and part of the measurement value table 7 of FIG. 4 in the case where the digital signal $a_1$ with error distribution shown by the hatched bar graph of FIG. 14 is measured. Further, FIG. 13 is a view showing the determination results, and part of the measurement value table 7 of FIG. 4 in the case where the digital signal $a_2$ with error distribution shown be the hatched bar graph of FIG. 15 is measured.

Figure 15:
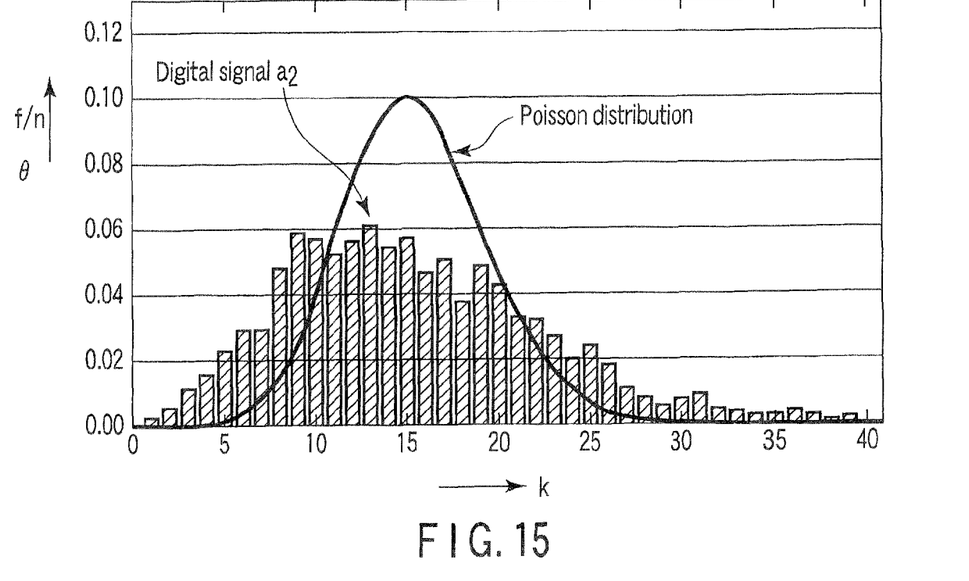
FIG. 15 is an error distribution chart of the other digital signal $a_2$ measured by the random error distribution evaluation apparatus.

As shown in FIGS. 14 and 15, the digital signal $a_1$ includes error distribution resembling (conforming to) the Poisson distribution, and the digital signal $a_2$ includes error distribution largely different from the Poisson distribution.

As for the measurement parameters of both the digital signals $a_1$ and $a_2$, the error rate E is $10^{-3}$, sample number n is 1023 to 1024, average measurement value is 15.2 to 15.3, and both the signals are substantially identical with each other in the expected value $n\theta$ and significance level $\alpha$ (=5%). However, in the digital signal $a_2$, the spread of the error distribution is larger, and hence the degrees of freedom $\phi$ (=29) thereof are larger than the degrees of freedom $\phi$ (=18) of the other digital signal $a_1$. As a result of this, the digital signals $a_1$ and $a_2$ are different from each other in the chi-square function $F(\chi^2, \phi)$, and are therefore different from each other in the target chi-square value $(\chi^2)\alpha$. Whereas the target chi-square value $(\chi^2)\alpha$ of the digital signal $a_2$ is 42. 56, the target chi-square value $(\chi^2)\alpha$ of the digital signal $a_1$ is 28.87.

Further, the measurement chi-square value $\chi^2$ of the digital signal a1 becomes 11.38, the target chi-square value $(\chi^2)\alpha$ becomes 28.87 or less, and hence conformity determination indicating that the error distribution of the digital signal $a_1$ conforms to the Poisson distribution is output.

On the other hand, the measurement chi-square value $\chi^2$ of the digital signal $a_2$ becomes 1181.58, and largely exceeds the target chi-square value $(\chi^2)\alpha$ (=42.58). Thus, non-conformity determination indicating that the error distribution of the digital signal $a_2$ does not conform to the Poisson distribution is output.

As described above, in the random error distribution evaluation method and random error distribution evaluation apparatus of this embodiment, it is possible to quantitatively determine whether or not the error distribution of the digital signal a output from the signal generation circuit 9 conforms to the ideal Poisson distribution existing in the natural world.

It should be noted that the present invention is not limited to the above-mentioned embodiment. For example, by setting the significance level $\alpha$ at, for example, 10% that exceeds 5%, it is possible to set the conformity determination criterion of the test in a stricter manner.

In the present invention, it is quantitatively determined whether or not the measured error distribution of the digital signal which is the object to be measured conforms to the Poisson distribution by using the chi-square goodness-of-fit determination method. Accordingly, it is possible to improve the test accuracy of the testing apparatus in which the signal generation circuit of the digital signal is incorporated with respect to the object to be tested.

What is claimed is:

1. A random error distribution evaluation method of a random error distribution evaluation apparatus for evaluating conformity of error distribution of a digital signal to Poisson distribution, wherein the digital signal includes error data which randomly generated at a predetermined error rate in the digital signal, the method comprising:

dividing the digital signal into n number of measurement units, the n number of the measurement units being determined based on the error rate, acquiring the measurement units corresponding to a sample number set in advance, and storing the acquired measurements units in a storage section of the random error distribution evaluation apparatus;

measuring a number of errors contained in each of the measurement units corresponding to a sample number as a measurement value;

calculating an average measurement value of the measured measurement values of the measurement units;

calculating a number of times of occurrence of each measurement value from the measured measurement values of the measurement units;

calculating a Poisson distribution function, in which each measurement value is used as a variable, by using the calculated average measurement value;

calculating an expected value of a number of times of occurrence for each measurement value from a corresponding function value of each measurement value of the calculated Poisson distribution function;

calculating for each measurement value, a deviation of the number of times of occurrence of the measurement value from the expected value of the measurement value, and calculating a chi-square value distribution function integrating the calculated deviation in each measurement value;

calculating a target chi-square value corresponding to a designated significance level in a chi-square distribution function determined bye degree or degrees of freedom obtained from a total number of the measurement values;

determining that the error distribution of the digital signal conforms to the Poisson distribution when the calculated chi-square value is smaller than the target chi-square value; and displaying on a display section of the random error distribution evaluation apparatus a result based on said determination.

2. An apparatus for evaluating conformity of error distribution of a digital signal to Poisson distribution, wherein the digital signal includes error data which is randomly generated at a predetermined error rate in the digital signal, said apparatus comprising:

a measurement parameter memory configured to store input measurement parameters including a data number Na, a sample number n, and a significance level $\alpha$ (%) of the conformity evaluation, wherein the data number Na is determined depending on the error rate;

a data input section configured to input the digital signal, which is measured as a measurement object, and divide the digital signal into the data number Na of measurements units, and output the sample number n of the measurements units which are sampled from the data number Na of the measurements units;

an error measurement section configured to measure a number of errors contained in each of the sample number n of the measurement units to output measurement values of the sample number of the measurement units;

an average calculation section configured to calculate an average value of the measurement values output from the error measurement section;

an occurrence calculation section configured to calculate a number of times of occurrence of each measurement value based on the measurement values measured in the error measurement section;

a measurement value table configured to store the number of times of occurrence calculated for each measurement value;

a Poisson distribution calculation section configured to calculate a Poisson distribution function, in which each measurement value is used as a variable, by using the calculated average measurement value;

an expected value calculation section configured to calculate an expected value of a number of times of occurrence for each measurement value from a corresponding function value of each measurement value of the calculated Poisson distribution function, and write each calculated expected value to the measurement value table;

a chi-square value calculation section configured to calculate for each measurement value, a deviation of the number of times of occurrence the measurement value from the expected value of the measurement value, and calculate a chi-square value which is obtained by integrating the calculated deviation in each measurement value;

a target chi-square value calculation section configured to calculate a target chi-square value corresponding to a designated significance level in a chi-square distribution function determined by a degree or degrees of freedom obtained from a total number of the measurement values;

a determination section configured to determine that the error distribution of the digital signal conforms to the Poisson distribution when the calculated chi-square value is smaller than the target chi-square value; and a display section configured to display a determination result of the determination section.

* * * * *